United States Patent
Nishimura et al.

(10) Patent No.: US 11,295,742 B2
(45) Date of Patent: Apr. 5, 2022

(54) VOICE OUTPUT APPARATUS AND VOICE OUTPUT METHOD

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Naoki Uenoyama, Nisshin (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 16/718,309

(22) Filed: Dec. 18, 2019

(65) Prior Publication Data

US 2020/0265837 A1 Aug. 20, 2020

(30) Foreign Application Priority Data

Feb. 20, 2019 (JP) .............................. JP2019-028487

(51) Int. Cl.
| | |
|---|---|
| *G10L 15/22* | (2006.01) |
| *G06F 3/16* | (2006.01) |
| *G10L 15/30* | (2013.01) |
| *G10L 15/18* | (2013.01) |
| *G10L 15/26* | (2006.01) |

(52) U.S. Cl.
CPC .............. *G10L 15/22* (2013.01); *G06F 3/167* (2013.01); *G10L 15/18* (2013.01); *G10L 15/26* (2013.01); *G10L 15/30* (2013.01); *G10L 2015/223* (2013.01)

(58) Field of Classification Search
CPC ......... G10L 15/00; G10L 15/18; G10L 15/22; G10L 15/26; G10L 15/30; G10L 2015/223; G06F 3/00; G06F 3/167
See application file for complete search history.

(56) References Cited

U.S. PATENT DOCUMENTS

| | | | | |
|---|---|---|---|---|
| 2004/0006483 | A1* | 1/2004 | Sasaki | G10L 15/22 704/277 |
| 2012/0265528 | A1* | 10/2012 | Gruber | G10L 15/183 704/235 |
| 2014/0136187 | A1* | 5/2014 | Wolverton | G10L 15/22 704/9 |
| 2015/0379362 | A1* | 12/2015 | Calmes | G06T 7/20 348/136 |
| 2017/0103757 | A1* | 4/2017 | Yamamoto | G10L 15/1807 |
| 2017/0263250 | A1 | 9/2017 | Kato et al. | |
| 2018/0032504 | A1* | 2/2018 | Hosn | G06F 40/35 |
| 2018/0341643 | A1* | 11/2018 | Alders | G10L 15/1822 |

FOREIGN PATENT DOCUMENTS

| | | |
|---|---|---|
| JP | 2009-254544 A | 11/2009 |
| JP | 2017-161644 A | 9/2017 |

* cited by examiner

*Primary Examiner* — Huyen X Vo
*Assistant Examiner* — Sean E Serraguard
(74) *Attorney, Agent, or Firm* — Oliff PLC

(57) ABSTRACT

In a voice output apparatus, an acquisition unit acquires a speech of an occupant of a vehicle. A determination unit determines whether or not the acquired speech is asking for repetition or rephrasing. A classification unit classifies, when it is determined that the speech is the asking, the speech according to a type of asking. An output unit outputs a voice sound in accordance with the classified type of the asking based on a content of a voice sound that is a target of the asking.

5 Claims, 2 Drawing Sheets

VOICE OUTPUT APPARATUS AND VOICE OUTPUT METHOD

INCORPORATION BY REFERENCE

The disclosure of Japanese Patent Application No. 2019-028487 filed on Feb. 20, 2019 including the specification, drawings and abstract is incorporated herein by reference in its entirety.

BACKGROUND

1. Technical Field

The present disclosure relates to a voice output apparatus and a voice output method of outputting a voice sound.

2. Description of Related Art

Navigation apparatuses which perform traveling guidance for a vehicle have been recently mounted on many vehicles. Japanese Patent Application Publication No. 2009-254544 discloses a technology of acquiring medical information of a driver, and when hearing of the driver deteriorates, increasing a volume of voice sounds in guidance with a navigation apparatus more than usual.

SUMMARY

There can be a case where an occupant hardly hears a voice sound of a navigation apparatus in the case of a loud noise inside and outside a vehicle cabin. Moreover, there can also be a case where the occupant cannot visually recognize a landmark at a route guidance place while information of the landmark is included in a voice sound of route guidance of the navigation apparatus. In these cases, it is difficult for the occupant to sufficiently understand contents of the voice sounds. It is therefore desirable to output an easily understandable voice sound when an occupant hardly understands a content of a voice sound of a navigation apparatus.

The present disclosure is devised in view of the aforementioned circumstance, and an object thereof is to provide a voice output apparatus and a voice output method capable of outputting, when an occupant hardly understands a content of an output voice sound, an easily understandable voice sound.

In order to solve the problem, a voice output apparatus according to an aspect of the present disclosure includes: an acquisition unit that acquires a speech of an occupant of a vehicle; a determination unit that determines whether or not the acquired speech is asking for repetition or rephrasing; a classification unit that classifies, when it is determined that the speech is the asking, the speech according to the type of asking; and an output unit that outputs a voice sound in accordance with the classified type of the asking based on the content of a voice sound that is the target of the asking.

According to this aspect, since the speech of the occupant is classified according to the type of asking and the voice sound in accordance with the classified type of the asking is output based on the content of the voice sound that is the target of the asking, when the occupant hardly understands the content of the voice sound of the voice output apparatus to make the asking, an easily understandable voice sound can be output.

The voice output apparatus may include an identification unit that identifies the content of the voice sound that is the target of the asking based on a voice sound output from the output unit immediately before the asking.

When the type of the asking is a type indicating that the meaning of the content of the voice sound is not understood, the output unit may output another voice sound relevant to the content of the voice sound that is the target of the asking.

When the type of the asking is a type indicating that the voice sound is missed, the output unit may reoutput the voice sound that is the target of the asking.

When the type of the asking is a type indicating that the voice sound is not audible, the output unit may reoutput the voice sound that is the target of the asking at a higher volume.

Another aspect of the present disclosure is a voice output method. The method includes: an acquisition step of acquiring a speech of an occupant of a vehicle; a determination step of determining whether or not the acquired speech is asking for repetition or rephrasing; a classification step of classifying, when it is determined that the speech is the asking, the speech according to the type of asking; and an output step of outputting a voice sound in accordance with the classified type of the asking based on the content of a voice sound that is the target of the asking.

According to this aspect, since the speech of the occupant is classified according to the type of asking and the voice sound in accordance with the classified type of the asking is output based on the content of the voice sound that is the target of the asking, when the occupant hardly understands the content of the voice sound of the voice output apparatus to make the asking, an easily understandable voice sound can be output.

According to the present disclosure, when an occupant hardly understands the content of an output voice sound, an easily understandable voice sound can be output.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
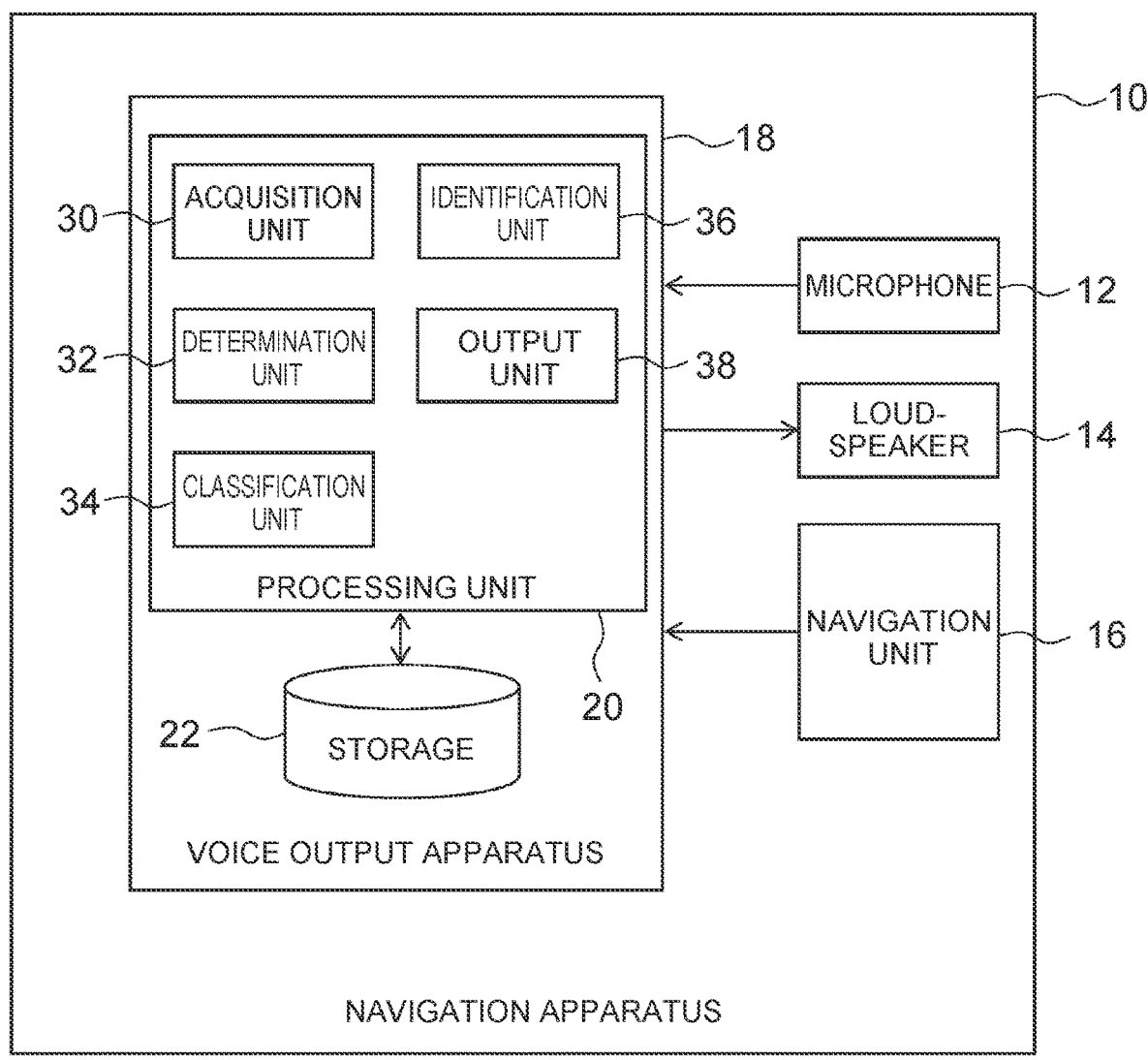
FIG. 1 is a block diagram of a navigation apparatus according to an embodiment.

FIG. 1 is a block diagram of a navigation apparatus 10 according to an embodiment. The navigation apparatus 10 is mounted on a vehicle which is an automobile. The navigation apparatus 10 includes a microphone 12, a loudspeaker 14, a navigation unit 16 and a voice output apparatus 18.

The microphone 12 is installed in a vehicle cabin of the vehicle, converts a voice sound in the vehicle cabin, such as a speech of an occupant, into a voice signal, and outputs the converted voice signal to the voice output apparatus 18. The loudspeaker 14 is installed in the vehicle cabin of the vehicle, converts a voice signal output from the voice output apparatus 18 into a voice sound, and outputs the voice sound.

The navigation unit 16 sets a guided route for route guidance using a known technology, causes a not-shown display unit to display the guided route and a map, causes the voice output apparatus 18 to output voice sounds for traveling guidance, and performs the traveling guidance along the guided route. The voice sound for traveling guidance contains information of marks of places on which the traveling guidance is performed, such as crossings. When a position of the vehicle reaches a place, on the guided route, on which the traveling guidance is to be performed, the navigation unit 16 performs traveling guidance, for example, "To the right soon. Convenience store ABC is the landmark." with a voice sound. The navigation unit 16 may cause the voice output apparatus 18 to output voice sounds of various kinds of information for improving convenience of a driver, such as traffic jam information and construction information on a traveling route, a weather forecast at a destination, and facility information near a current place.

The voice output apparatus 18 includes a processing unit 20 and a storage 22. The processing unit 20 includes an acquisition unit 30, a determination unit 32, a classification unit 34, an identification unit 36 and an output unit 38. A configuration of the processing unit 20 can be realized, as hardware, by a CPU of any computer, a memory, and other LSIs, and can be realized, as software, by a program loaded into a memory, or the like. There are herein described functional blocks realized in cooperation between those. Accordingly, a person skilled in the art should understand that these functional blocks can be realized in various forms only by hardware, only by software, or by a combination of these.

The output unit 38 outputs a voice sound via the loudspeaker 14 or the like based on voice information for traveling guidance and the like supplied from the navigation unit 16.

The acquisition unit 30 acquires a speech of an occupant of the vehicle via the microphone 12. The occupant occasionally makes a speech such as "Eh?", that is, asking a question (asking for repetition or rephrasing) when the occupant misses a voice sound for traveling guidance or the like from the navigation apparatus 10 or when the occupant cannot understand a content of the voice sound. The acquisition unit 30 performs voice recognition on the speech of the occupant based on a voice signal output from the microphone 12, acquires the speech as text data, and supplies the text data of the speech to the determination unit 32 and the classification unit 34.

The storage 22 beforehand holds text data of a plurality of pieces of such asking as a database. The determination unit 32 refers to the database of the storage 22, determines whether or not the speech acquired by the acquisition unit 30 is asking a question, and supplies a determination result to the classification unit 34 and the identification unit 36. The determination unit 32 determines that the speech is asking a question when the text data of the speech coincides with text data of asking in the database. The determination unit 32 does not determine that the speech is asking a question when the text data of the speech does not coincide with any text data of asking in the database. The determination unit 32 may determine that the speech is asking a question when the text data of the speech coincides with text data of asking in the database and an end of the speech rises in tone of voice. This can enhance determination accuracy.

When the speech is the asking, based on a voice sound output from the output unit 38 immediately before the asking, the identification unit 36 identifies a content of the voice sound which is a target of the asking, and supplies the identified content of the voice sound to the output unit 38. Thereby, it can be easily correctly identified on the content of which voice sound the occupant has made the asking.

When it is determined that the speech is the asking, the classification unit 34 classifies the speech according to a type of asking, and supplies the classified type of the asking to the output unit 38. Types of asking include a first type indicating that the occupant does not understand a meaning of the content of the voice sound, a second type indicating that the occupant misses the voice sound, and a third type indicating that the occupant cannot hear the voice sound.

The storage 22 also beforehand holds corresponding relation between each of the text data of the plurality of pieces of asking and a type of asking as a database. Each piece of asking is uniquely associated with a type of asking. For example, asking such as "Where is it?" or "Which one is it?" is associated with the first type. Asking such as "Eh? What did you say?" is associated with the second type. Asking such as "Huh? Hard to hear you." is associated with the third type. Asking such as "What?" which possibly corresponds to any of the first to third types and is hard to be classified according to the type is associated with the second type. Moreover, asking that does not correspond to neither the first type or the third type is associated with the second type.

The classification unit 34 refers to the database of the storage 22, identifies a type of text data of asking that coincides with the text data of the speech, and sets the identified type to be the type of the asking.

Based on the content of the voice sound which is the target of the asking supplied from the identification unit 36, the output unit 38 outputs a voice sound in accordance with the type of the asking classified by the classification unit 34 via the loudspeaker 14 and the like.

When the type of the asking is the first type, the output unit 38 outputs another voice sound relevant to the content of the voice sound which is the target of the asking. The storage 22 beforehand holds one or more other voice data associated with the content of a voice sound for each of the contents of voice sounds which is to be a target of asking as a database. For example, when the content of the voice sound which is the target of the asking is "Convenience store ABC is the landmark", pieces of voice data such as "A red signboard is the landmark" and "A red building is the landmark" which the content of the voice sound which is the target of the asking is to be replaced by are associated with that content of the voice sound. Namely, it is supposed in this example that the signboard and the building of the "convenience store ABC" are red. When the occupant cannot understand the meaning of the voice sound "Convenience store ABC is the landmark" due to a reason that the occupant cannot visually recognize the characters "Convenience store ABC" and does not know the color of its signboard or building or the similar reason, the occupant can listen to a voice sound such as "A red signboard is the landmark" relevant to the content of the voice sound the meaning of which the occupant has not understood, and is possibly able to understand that content.

When the type of the asking is the second type, the output unit 38 reoutputs the voice sound which is the target of the asking. Thereby, when the occupant has missed the voice sound, the occupant can listen to the missed voice sound again, and more easily understands that content. Also when the type of the asking is hardly classified or does not correspond to neither the first type or the third type, the voice sound is reoutput, and therefore, the occupant is possibly caused to understand the content of the voice sound even when intention of the asking is hardly specified.

When the type of the asking is the third type, the output unit 38 reoutputs the voice sound which is the target of the asking at a higher volume. Thereby, the occupant can listen to the voice sound that the occupant has not been able to hear due to influence of surrounding noise, occupant's low hearing, or the like, again at a more audible volume, and more easily understands that content.

Figure 2:
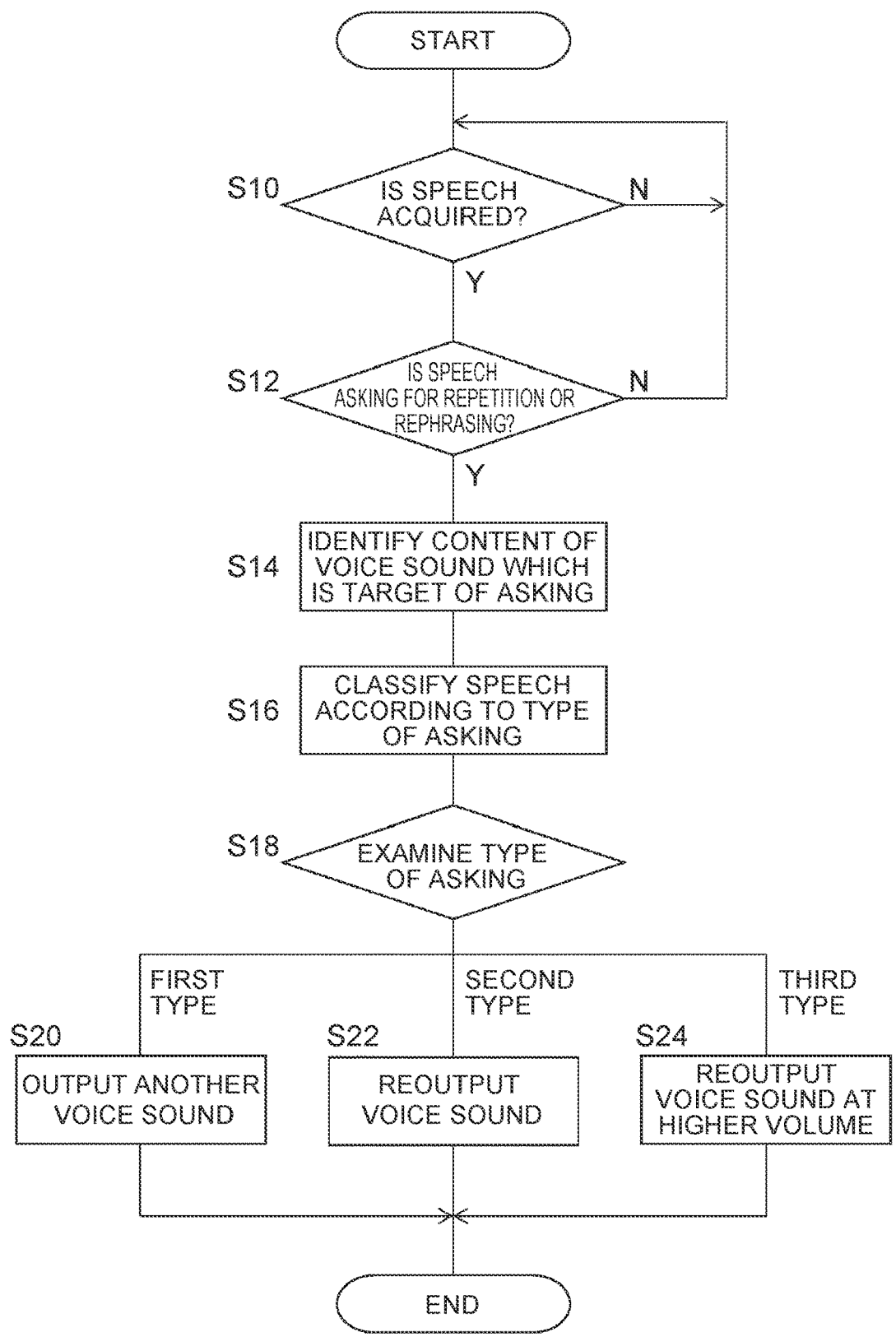
FIG. 2 is a flowchart showing voice output processing of a voice output apparatus in FIG. 1.

Next, overall operation of the voice output apparatus 18 with the configuration above is described. FIG. 2 is a flowchart showing voice output processing of the voice output apparatus 18 in FIG. 1. The processes in FIG. 2 are repeatedly performed.

When the acquisition unit 30 does not acquire a speech of the occupant (N in S10), the process waits in step S10. Upon acquisition of the speech (Y in S10), when the speech is not asking for repetition or rephrasing (N in S12), the process returns to step S10. When the speech is such asking (Y in S12), the identification unit 36 identifies the content of the voice sound which is the target of the asking (S14), the classification unit 34 classifies the speech according to the type of asking (S16), and the output unit 38 examines the type of the asking (S18).

When the type of the asking is the first type, the output unit 38 outputs another voice sound relevant to the content of the voice sound which is the target of the asking (S20) to end the process. When the type of the asking is the second type, the output unit 38 reoutputs the voice sound which is the target of the asking (S22) to end the process. When the type of the asking is the third type, the output unit 38 reoutputs the voice sound which is the target of the asking at a higher volume (S24) to end the process.

According to the present embodiment, when the occupant hardly understands the content of the voice sound of the voice output apparatus 18 to make the asking, an easily understandable voice sound can be output. Moreover, since the speech of the occupant is classified according to the type of asking and a voice sound in accordance with the identified type of the asking is output, a configuration can be simplified more than in the case where voice sounds for output are generated individually for a plurality of pieces of asking. Therefore, costs can be restrained from increasing, and the navigation apparatus 10 suitable for in-vehicle uses can be provided.

The present disclosure is described above based on an embodiment. The embodiment above is merely exemplary, and a person skilled in the art should understand that various modifications are possible for the combination of the components and the processes therein and such modifications can occur without departing from the scope of the present disclosure.

For example, the voice output apparatus 18 may include an image recognition unit which performs image recognition on an image, of the inside of the vehicle cabin, captured by a camera in the vehicle cabin and detects an occupant who is possibly asleep. A know technology can be used for the image recognition. When the type of the asking is the second type, the output unit 38 may reoutput a voice sound which is the target of the asking at a higher volume when the image recognition unit does not detect an occupant who is possibly asleep. Thereby, an occupant can be caused to understand the missed content of the voice sound more easily than in the case where the voice sound is reoutput at a maintained volume. Meanwhile, when the type of the asking is the second type, the output unit 38 may reoutput the voice sound which is the target of the asking at a maintained volume when the image recognition unit detects an occupant who is possibly asleep. This can result in consideration toward an occupant who is asleep.

While in the embodiment, it is determined with reference to the database whether or not a speech is the asking to classify the speech according to the type of asking, the determination unit 32 and the classification unit 34 may perform intention understanding on the content of the speech, and according to a result of the intention understanding, determine whether or not the speech is the asking to classify the speech according to the type of asking. A known technology can be used for the intention understanding. With this modification, flexibility in configuration of the voice output apparatus 18 can be improved.

What is claimed is:

1. A voice output apparatus comprising:
a processor programmed to:
acquire speech of an occupant in a vehicle;
acquire an image of the occupant of the vehicle, and perform image recognition on the acquired image of the occupant of the vehicle;
determine whether the occupant is sleeping based on the image recognition;
determine whether the acquired speech indicates that repetition or rephrasing of a previously outputted voice sound is required;
in response to determining that the previously outputted voice sound requires repetition or rephrasing, classify the acquired speech as one of a plurality of types of asking, the plurality of types of asking including a third type based on the acquired speech indicating that the previously outputted voice sound was not audible;
in response to determining that the occupant is not sleeping, classifying the acquired speech as the third type, re-output a voice sound at a higher volume than a volume of the voice sound that was previously outputted;
and in response to determining that the occupant is sleeping and classifying the acquired speech as the third type, re-output the voice sound at a same volume as the previously outputted voice sound.

2. The voice output apparatus according to claim 1, wherein the processor is programmed to identify a content of the previously outputted voice sound based on the voice sound output immediately before the acquired speech.

3. The voice output apparatus according to claim 1, wherein the processor is programmed to: determine whether the acquired speech indicates that a meaning of a content of the previously outputted voice sound is not understood;
classify the acquired speech as a first type of the plurality of types of asking based on the acquired speech indicating that the previously outputted voice sound is not understood, and in response to classifying the acquired speech as the first type, re-output another voice sound that rephrases a content of the previously outputted voice sound.

4. The voice output apparatus according to claim 1, wherein the processor is programmed to: determine whether the acquired speech indicates that the previously outputted voice sound is missed;
classify the acquired speech as a second type of the plurality of types of asking based on the acquired speech indicating that the previously outputted voice sound is missed;
and in response to classifying the acquired speech as the second type, re-output the voice sound based on the voice sound output immediately before the acquired speech.

5. A voice output method comprising:
a first acquisition step of acquiring a speech of an occupant in a vehicle;

a second acquisition step of acquiring an image of the occupant of the vehicle, and performing image recognition on the acquired image of the occupant of the vehicle;

a first determination step of determining whether the acquired speech indicates that repetition or rephrasing of a previously outputted voice sound is required;

a second determination step of determining whether the occupant is sleeping based on the image recognition;

in response to determining that the previously outputted voice sound requires repetition or rephrasing, classify the acquired speech as one of a plurality of types of asking, the plurality of types of asking including a third type based on the acquired speech indicating that the previously outputted voice sound was not audible;

in response to determining that the occupant is not sleeping and classifying the acquired speech as the third type, re-output a voice sound at a higher volume than a volume of the voice sound that was previously outputted; and in response to determining that the occupant is sleeping and classifying the acquired speech as the third type, re-output the voice sound at a same volume as the previously outputted voice sound.

* * * * *